United States Patent [19]
Takahashi et al.

[11] Patent Number: 5,897,604
[45] Date of Patent: Apr. 27, 1999

[54] APPARATUS AND METHOD FOR NAVIGATING MOBILE BODY USING BIRD'S EYE VIEW ON DISPLAY SCREEN

[75] Inventors: Toshiaki Takahashi, Yokohama; Masayuki Takada, Yokosuka; Norimasa Kishi, Yokohama, all of Japan

[73] Assignee: Nissan Motor Co., Ltd., Yokohama, Japan

[21] Appl. No.: 08/771,915

[22] Filed: Dec. 23, 1996

[30] Foreign Application Priority Data

Dec. 26, 1995 [JP] Japan ................................. 7-338926

[51] Int. Cl.$^6$ .................................................. G06F 165/00
[52] U.S. Cl. .......................... 701/208; 701/200; 340/990; 340/995
[58] Field of Search ..................................... 701/200, 201, 701/202, 207, 208, 209, 211; 73/178 R; 340/988, 990, 995

[56] References Cited

U.S. PATENT DOCUMENTS

| | | | |
|---|---|---|---|
| 5,121,326 | 6/1992 | Moroto et al. | 364/449 |
| 5,161,886 | 11/1992 | De Jong et al. | 364/449 |
| 5,732,385 | 3/1998 | Nakayama et al. | 701/201 |
| 5,742,924 | 4/1998 | Nakayama | 701/208 |
| 5,748,109 | 5/1998 | Kosaka et al. | 701/202 |
| 5,757,290 | 5/1998 | Watanabe et al. | 701/200 |
| 5,793,310 | 8/1998 | Watanabe et al. | 340/995 |

FOREIGN PATENT DOCUMENTS 7-220055  8/1995  Japan .

Primary Examiner—Gary Chin
Attorney, Agent, or Firm—Foley & Lardner

[57] ABSTRACT

In apparatus and method for navigating a mobile body such as a vehicle through a road map display image, an angle of a displayed traffic intersection with respect to, for example, a lateral axis crossing the traffic intersection is made coincident with an angle of an actually corresponding traffic intersection. That is to say, display coordinates at a predetermined part (for example, the traffic intersection) of a display image in a form of bird's eye view are modified, the predetermined part meaning a view focusing point or area, so that a scale in a longitudinal direction is made coincident with that in a lateral direction at the predetermined part.

11 Claims, 16 Drawing Sheets

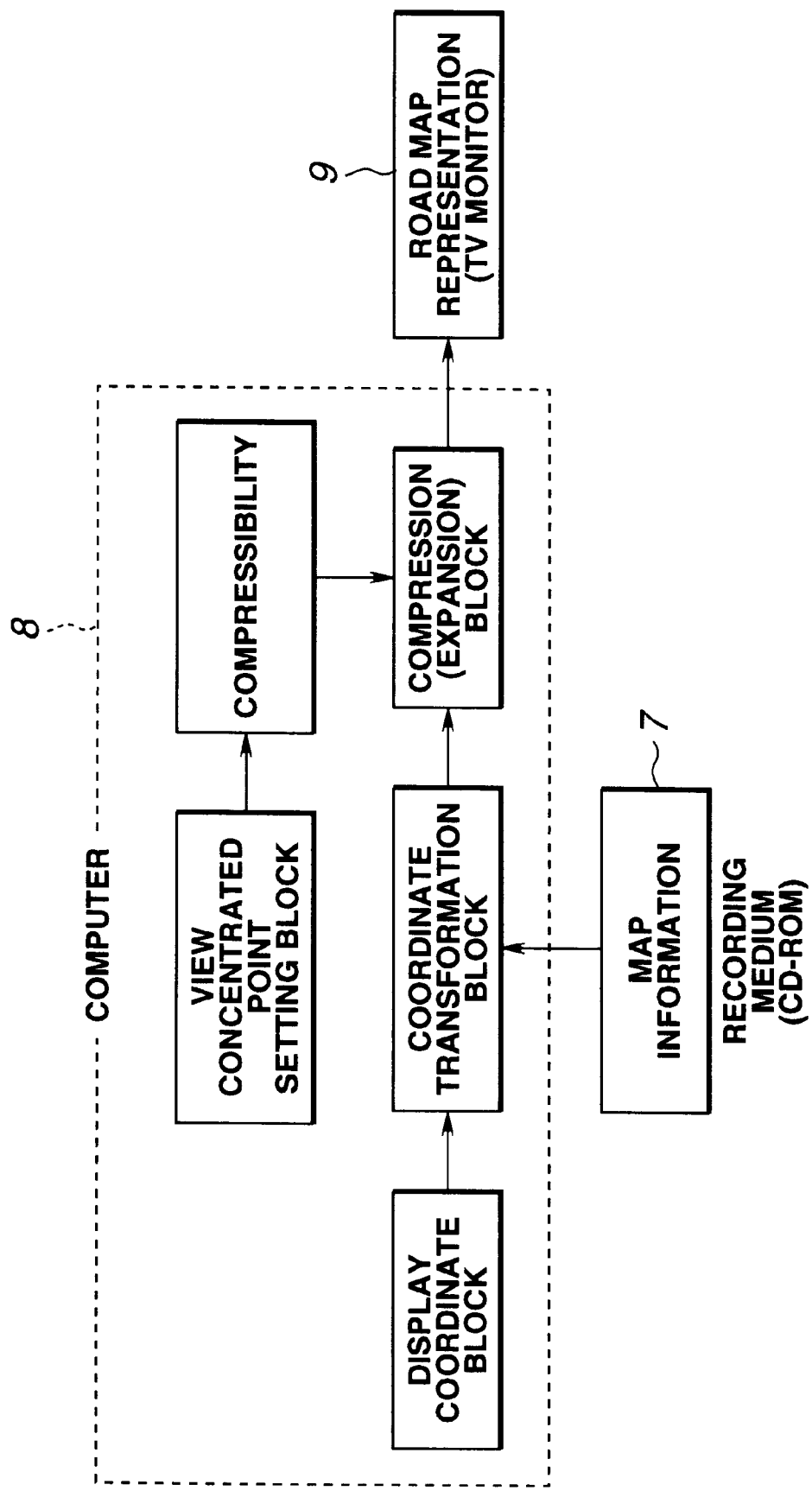

APPARATUS AND METHOD FOR NAVIGATING MOBILE BODY USING BIRD'S EYE VIEW ON DISPLAY SCREEN

BACKGROUND OF THE INVENTION

The present invention relates to apparatus and method for navigating a mobile body such as a vehicle which achieve a road map display in a form of a bird's eye view on a display screen of a display unit.

A Japanese Patent Application First Publication No. Heisei 7-220055 published on Aug. 18, 1995 exemplifies a previously proposed navigating apparatus in which a topographical road map in the form of a bird's eye view (perspectively projected representation) is displayed on the screen of the display unit.

However, since the bird's eye view representation means that a region of the road map viewed obliquely from an upper sky as a viewpoint, a displayed road map is viewed in such a way that the road map is compressed in terms of its longitudinal direction. Hence, the following inconveniences are raised.

(1) A displayed angle of a road segment crossing at a traffic intersection with respect to a lateral axis on the displayed bird's eye view does not coincide with that of the road segment crossed at an actually corresponding intersection.

For example, the displayed angle of each road segment crossing the intersection in an example of the bird's eye view representation shown in FIG. 15 is different from that crossing the intersection in an example of a plan view (top view) representation (the same display as an actual road situation) shown in FIG. 16.

(2) Even if the display of the same road segment occurs in the same place, a length of the road segment is often varied according to a direction of a line of sight from the viewpoint of the bird's eye view.

SUMMARY OF THE INVENTION

It is an object of the present invention to provide improved apparatus and method for navigating a mobile body which achieve a display of a region of any meshes of road map information in a form of a bird's eye view on a display image screen of a display unit and which achieve an angle of a displayed traffic intersection on the display image screen which matches that of an actually corresponding traffic intersection at an arbitrary point or arbitrary area of the display image screen.

The above-described object can be achieved by providing an apparatus for navigating a mobile body through a road map display image, comprising:

an external memory arranged for storing a topographical road map information on a plurality of road map meshes;

a display reference point determining unit arranged for determining a display reference point on the basis of which a region in meshes of the road map stored in the external memory is determined to be displayed on an image screen;

an arithmetic operation processing unit arranged for executing an arithmetic operation and processing required to display any meshes of the road map information which corresponds to a display region determined to be displayed on the image screen in a form of a bird's eye view; and an image display unit arranged for displaying the region in meshes of the road map stored in the external memory unit to be determined to the displayed on the image screen thereof in the form of the bird's eye view, wherein said arithmetic operation processing unit comprises:

determining block arranged for determining the region in meshes of the road map stored in the external memory to be displayed on the image screen on the basis of the determined display reference point and for determining coordinate transformation parameters to be used for a perspective projection transformation of the region of the meshes of the road map into the bird's eye view on the basis of the determined display reference point;

road map data inputting block arranged for reading the road map information of the display region of meshes of the road map to be displayed from the external memory unit into said arithmetic operation processing unit;

coordinate transformation calculating block arranged for executing a coordinate transformation of the region of the road map meshes to be displayed into display coordinates on the perspectively projected plane using the coordinate transformation parameters; and display coordinate modifying block arranged for modifying the display coordinates at a predetermined part in the display region of the road map meshes so that a scale in a longitudinal direction with respect to the display image screen is coincident with that in a lateral direction at the predetermined part.

The above-described object can also be achieved by providing a method for navigating a mobile body through a road map display image, comprising the steps of:

a) storing a road map information on a plurality of road map meshes;

a) determining a display reference point on the basis of which a region in meshes of the road map stored at the step a) is determined to be displayed on an image screen of a display unit;

c) executing an arithmetic operation processing required to display any meshes of the road map information which corresponds to a display region determined to be displayed on the image screen in a form of a bird's eye view; and d) displaying the region in meshes of the road map stored at the step a) to be determined to be displayed on the image screen in the form of the bird's eye view, wherein said step c) comprises the steps of:

e) determining the region in meshes of the information stored at the step a) to be displayed on the image screen on the basis of the determined display reference point;

f) determining coordinate transformation parameters to be used for a perspective projection transformation of the region of the meshes of the road map into the bird's eye view on the basis of the determined display reference point;

g) reading the road map information of the display region of meshes of the road map to be displayed;

h) executing a coordinate transformation of the display region of the road map meshes to be displayed into display coordinates on the perspectively projected plane using the coordinate transformation parameters; and i) modifying the display coordinates at a predetermined part in the display region of the road map meshes so that a scale in a longitudinal direction with respect to the display image screen is coincident with that in a lateral direction at the predetermined part.

BRIEF DESCRIPTION OF THE DRAWINGS

FIG. 3 is a functional block diagram of the vehicular navigating apparatus in the first preferred embodiment.

BEST MODE FOR CARRYING OUT THE INVENTION

Reference will hereinafter be made to the drawings in order to facilitate a better understanding of the present invention.

(FIRST EMBODIMENT)

Figure 1A:
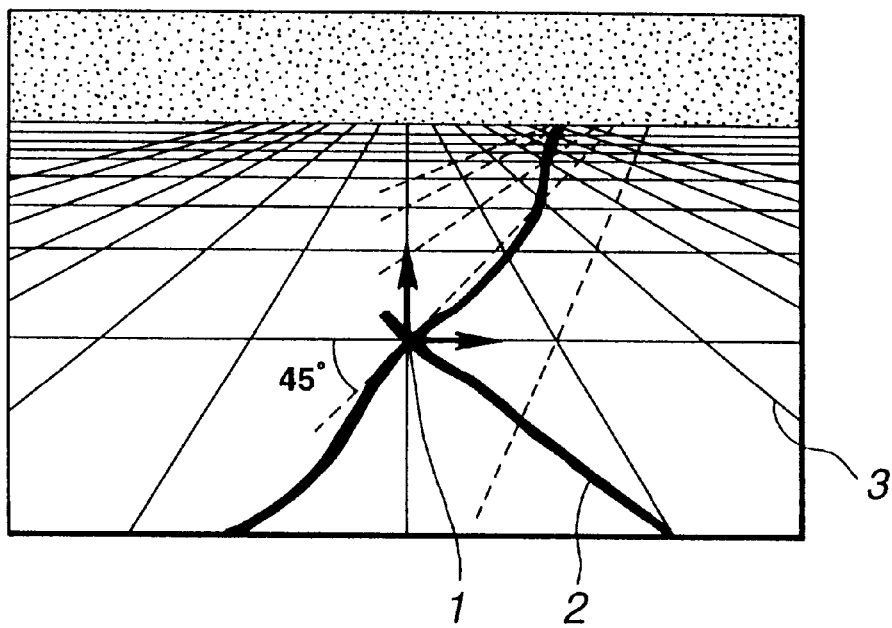
FIG. 1A is an exemplified display image of a display screen of a display unit in a vehicular navigating apparatus in a first preferred embodiment according to the present invention.

FIG. 1A shows an example of a displayed image on a display screen of a television monitor (for example, a full color liquid crystal display) in a form of a bird's eye view executed in a first preferred embodiment of a vehicular navigating apparatus according to the present invention.

Figure 1B:
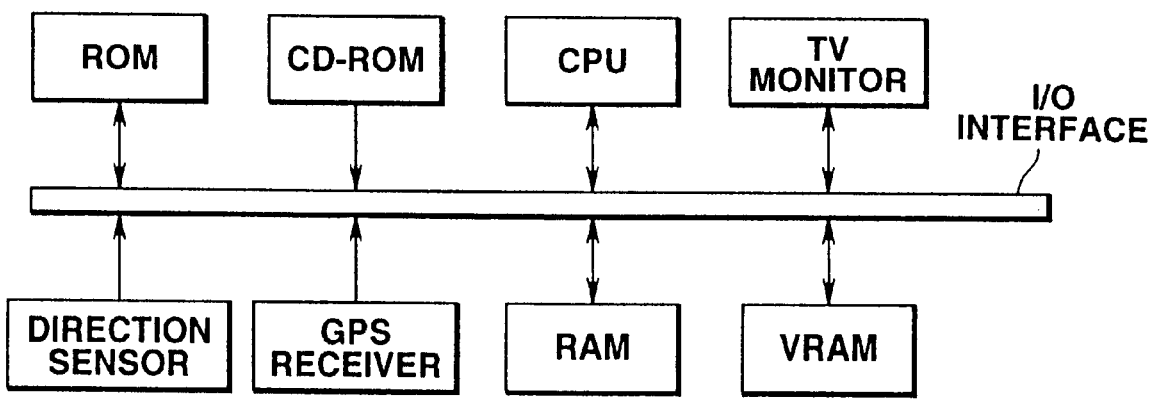
FIG. 1B is a hardware circuit block diagram of the vehicular navigating apparatus in the first preferred embodiment according to the present invention.

FIG. 1B shows an example of a hardware structure of the vehicular navigating apparatus according to the present invention.

In FIG. 1A, a plurality of thin, solid grid lines 3 run on a road map image of the displayed screen to indicate predetermined longitudes and latitudes and a traffic intersection 1 (in FIG. 1A, a traffic intersection in a freeway) is positioned so as to intersect with a branched road 2 on which the vehicle is running.

A road denoted by a bold solid line is a road indicating a recommended route to a destination at which the vehicle is finally to reach. Pseudo horizon and sky are displayed as shown in FIG. 1A.

Figure 16:
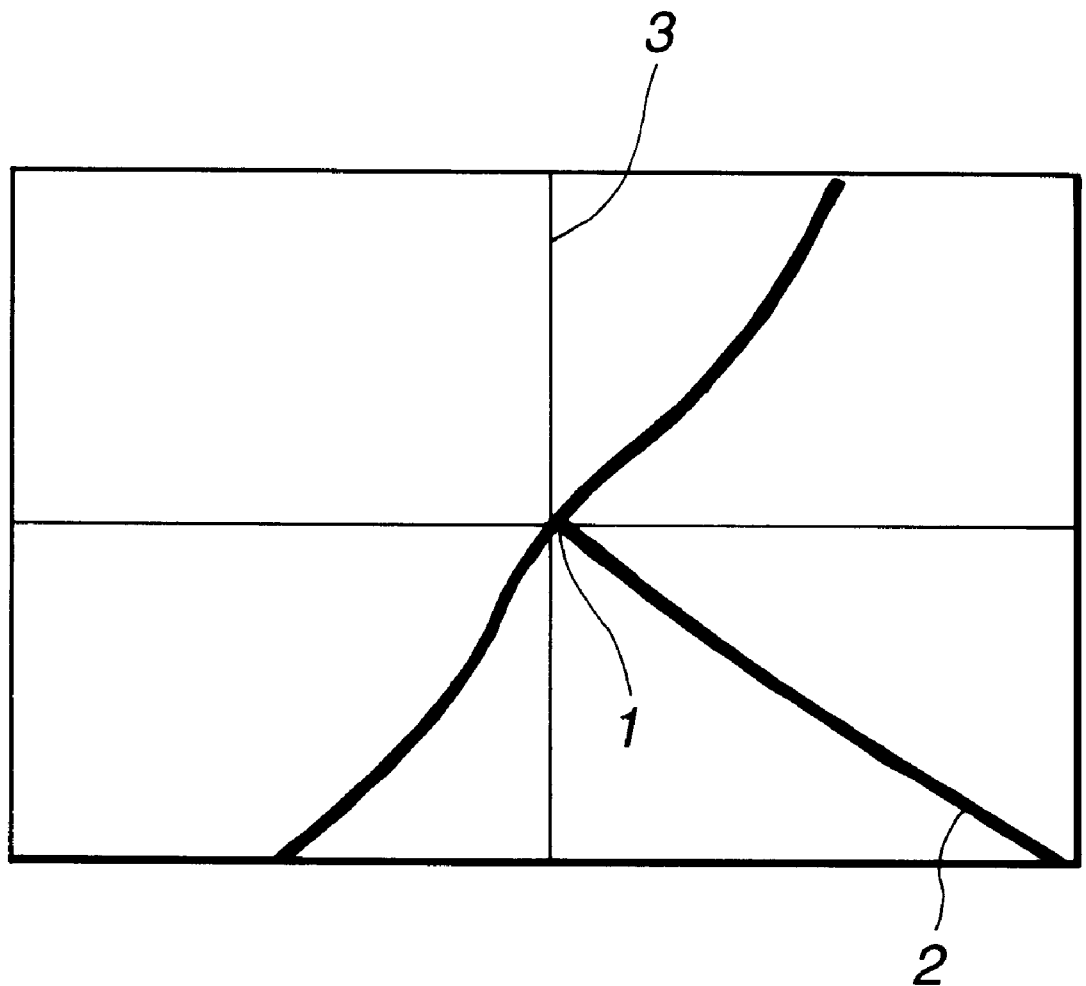
FIG. 16 is an explanatory view of a road map display image in a form of a conventional top (plan) view.

As shown in FIG. 1A, in a case where a scale in a longitudinal direction is coincident with that in a lateral direction at a certain spot on the displayed road map, an angle of the traffic intersection 1 with respect to one of the grid lines crossing laterally the traffic intersection 1 on the displayed image is coincident with that of the traffic intersection on the road map (i.e., refer to a displayed image in the form of a top view as shown in FIG. 16).

In order to make the scales in the longitudinal and lateral directions coincident with each other at the certain spot, the displayed road map in the lateral direction may be compressed or expanded by an appropriate of compression or expansion.

The details of the compression or expansion of the displayed road map image will be described below.

It is noted that, in FIG. 1B, the hardware structure of the vehicular navigating apparatus includes an Input/Output interface, a CPU, the liquid crystal display (TV monitor), a V-RAM (Video-RAM), a RAM (Random Access Memory), a CD-ROM (Compact Disc ROM) storing the road map information divided in a form of a plurality of meshes and character data, such as, indicating a name of place, a name of road, and so forth, a ROM (Read-Only Memory), a GPS (Grobal Positioning System) receiver, and a direction sensor.

Figure 2A:
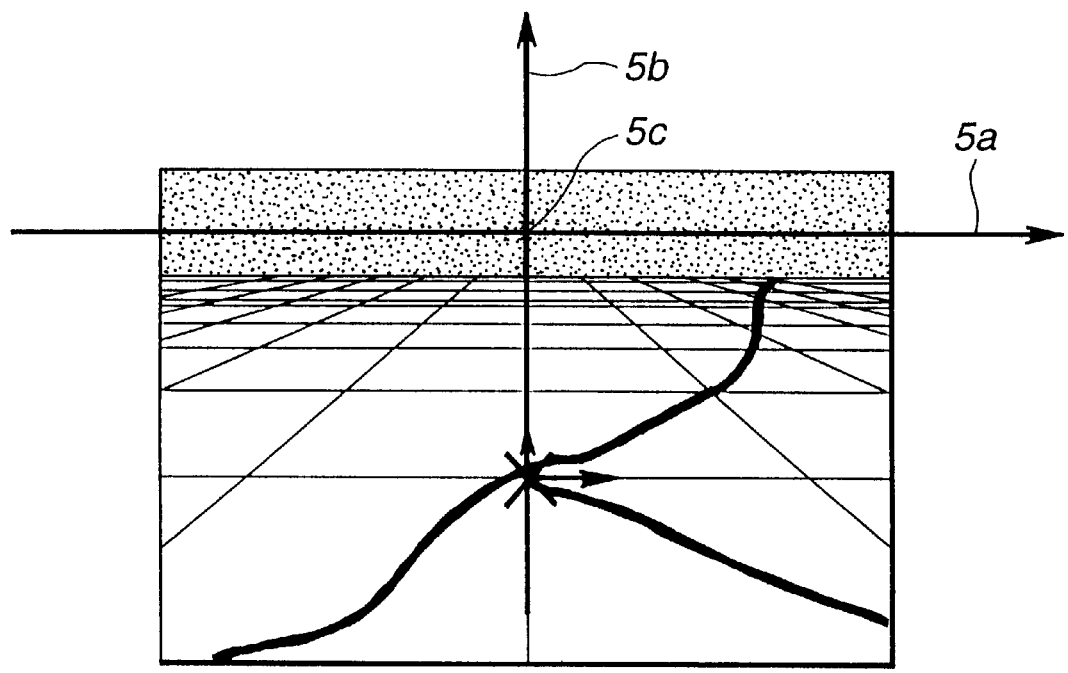
FIGS. 2A and 2B are explanatory views of coordinates on a bird's eye view representation in the vehicular navigating apparatus according to the present invention.
Figure 2B:
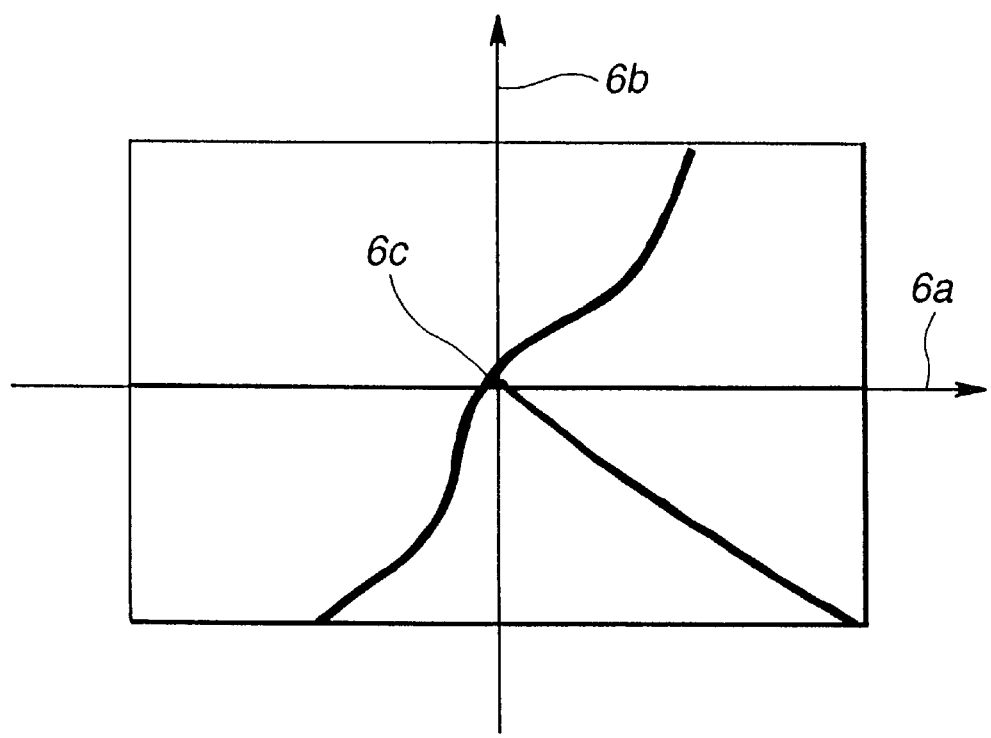

Suppose, as shown in FIGS. 2A and 2B, that left and right directions on the displayed road map image viewed away from the display screen be x direction $5a$, up and down directions be y direction $5b$, a vanishing point (a limit spot of display: a front point at which all grid lines are met in a vehicular forwarding direction be an origin $5c$, and road map coordinates in which X direction is coincident with x direction $6a$ and Y direction is coincident with y direction $6b$ be (X, Y).

In the bird's eye view representation, the following equations (1) and (2) are established:

The details of derivations of the equations (1) and (2) will be explained later with reference to FIGS. 5 and 6.

$$Y=(-b/y)+c \qquad (1),$$

$$X=-a \cdot (x/y) \qquad (2),$$

wherein a, b, and c denote arbitrary numbers (constants).

At this time, the following equations are established:

$$dY/dy=b/y^2 \qquad (3)$$

and $$dX/dx=-a/y \qquad (4).$$

That is to say, the equation (3) means that the value of dY/dy which is proportional to the 1/scale in the longitudinal direction is $b/y^2$ and the equation (4) means that the value of dX/dx which is proportional to 1/scale in the lateral direction indicates $-a/y$.

Hence, in a case where the traffic intersection 1 in FIG. 1A is supposed to be a view focusing point (xs, ys), the following equation of dY/dy=dX/dx needs to be established at the view focusing point (xs, ys) to make the focusing point coincident with the reduced scales in the longitudinal direction and in the lateral direction at the view focusing point. The view focusing (concentrated) point is a spot on the display image toward which an eye line of a viewer is supposed to be directed to recognize a shape and/or situation thereat and is generally different from a definition of a display reference point on the basis of which the road map meshes to be displayed in the form of the bird's eye view are perspectively projected. (The display reference point is exemplified by a U.S. patent application Ser. No. 08/384,715 filed on Feb. 3, 1995, the disclosure of which is herein incorporated by reference). Hence, the following equations (5) and (6) are derived from the equations (3) and (4).

$$b/y^2 = a/y \quad (5),$$

$$b = -a \cdot y \quad (6)$$

The equation (3) means that the value of dY/dy which is proportional to 1/scale in the longitudinal direction indicates $b/y^2$ and the equation (4) indicates that dX/dx which is proportional to 1/scale in the lateral direction gives $-a/y$.

Hence, in a case where the traffic intersection 1 of FIG. 1A is the view focusing point (xs, ys), dY/dy=dX/dx can be established at the view focusing point (xs, ys) in order to coincide the scale in the longitudinal direction with the scale in the lateral direction at the view focusing point (xs, ys). Hence, the following equations (5) and (6) can be established from the equations (3) and (4).

$$b/y^2 = -a/y \quad (5)$$

$$b = -a \cdot y \quad (6)$$

In the display coordinate calculations, the display road map may be compressed or expanded in the lateral direction so as to satisfy the equation of (6).

FIG. 3 shows a functional block diagram of the navigating apparatus executing the above-described series of calculations for the bird's eye view display in the first embodiment.

Figure 4:
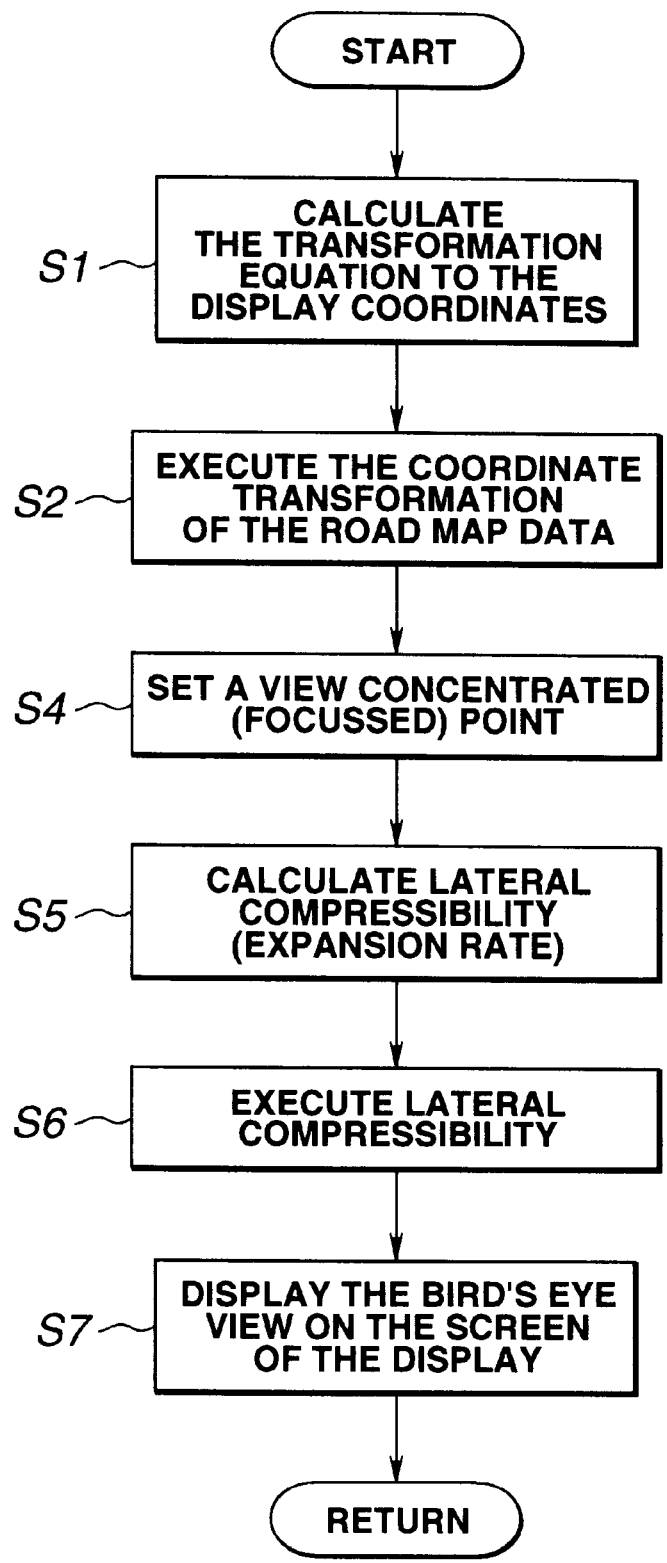
FIG. 4 is an operational flowchart executed by a computer of the vehicular navigating apparatus shown in FIG. 3.

FIG. 4 shows a flowchart diagram of the navigating apparatus executed in the CPU, i.e., a computer shown in FIG. 3 according to the present invention.

In FIG. 3, an external storing medium 7 stores the map information (for example, the CD-ROM) and the arithmetic operation processing unit 8 (for example, the computer, i.e., the CPU, the ROM, the RAM, and V-RAM shown in FIG. 1B) calculates the various types of calculations indicated by the flowchart of FIG. 4 (such as setting of the view focusing point). In addition, a display unit 9 (for example, the liquid crystal display) displays a result of the series of calculations executed by the arithmetic operation unit 8.

In FIG. 4, at a step S1, the CPU calculates the calculation of the transformation from the coordinates on the meshes of the plane viewed road map information to the display coordinates in order to display the road map data stored in the storing medium in the form of the bird's eye view (perspective representation). That is to say, it is necessary to calculate a drawing data in the bird's eye view in the bird's eye view representation. The stored road map data are perspectively transformed on a given light irradiated plane with the set position being the viewpoint.

Next, the detailed explanation of the bird's eye view representation in the case of the first embodiment will be made hereinbelow with reference to FIGS. 5 and 6.

An arbitrary point (X, Y) on the plan viewed road map coordinates is transformed into display coordinates (x, y).

Figure 6:
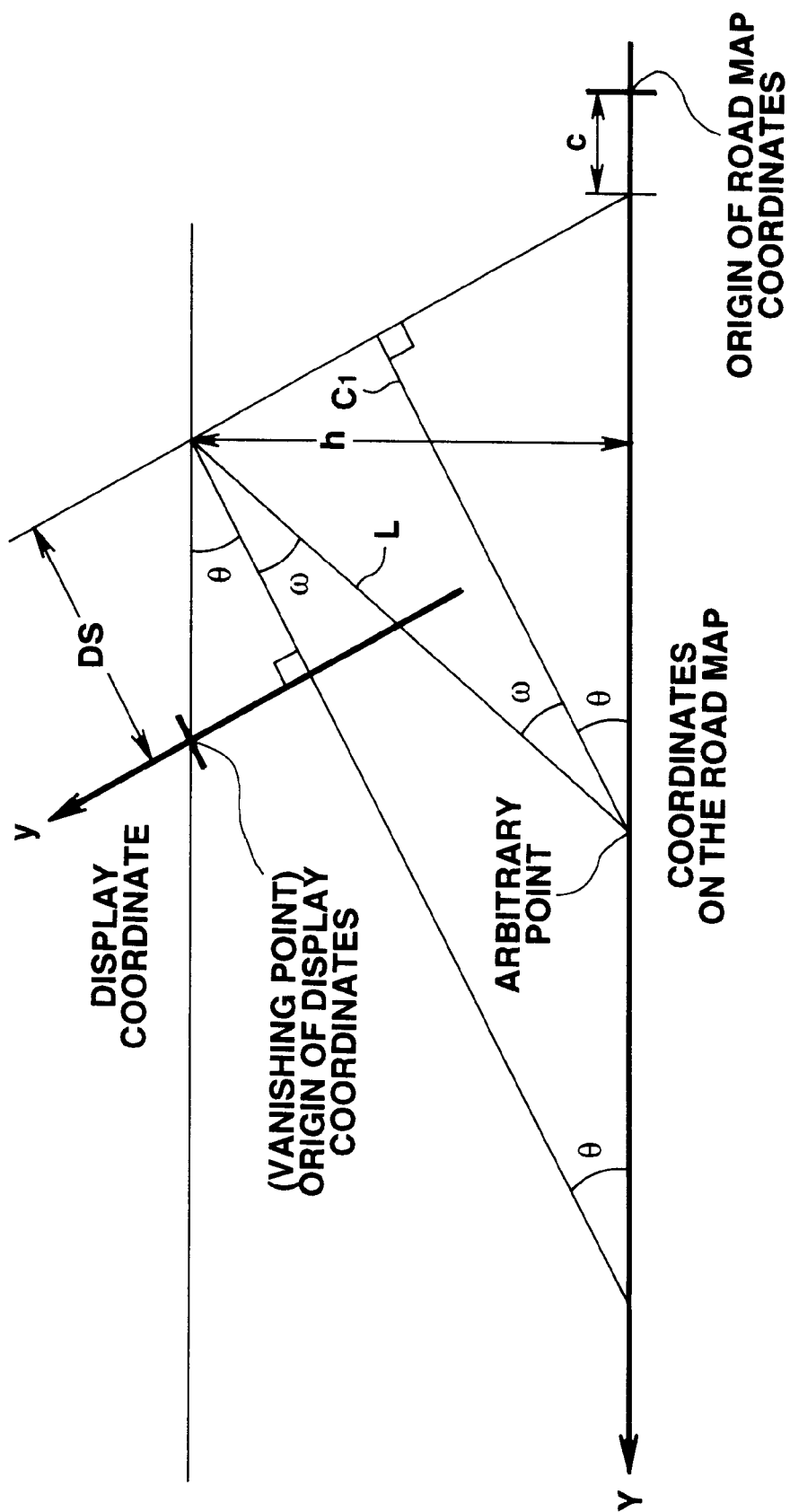
FIG. 6 is an explanatory view of a coordinate transformation formula (X direction) used to transform an arbitrary point on the road map coordinates into a display coordinate.

As appreciated from FIG. 6, y is given as:

$$y = -DS \cdot \tan \theta - DS \cdot \tan \omega$$

$= -DS (\tan \theta + \tan \omega))$, wherein $\theta$ denotes an angle between a vanishing point of the grid lines on the display coordinates (origin of the display coordinates) and the display reference point with the viewpoint as the center and $\omega$ denotes an angle between the display reference point and the arbitrary point on the display coordinates, and DS denotes a distance from the viewpoint to the display reference point. These angles of $\theta$ and $\omega$ are found in FIG. 6.

In addition, the arbitrary point in the Y axis on the road map coordinates is given as:

$$h = L \sin (\theta + \omega), L = h/\sin (\theta + \omega), L \cos \omega = c1,$$

$(Y-c) \cos \theta = c1, \therefore Y = c1/\cos \theta + c, \because Y = h/\sin (\theta + \omega) \cdot \cos \omega/\cos \theta + c$. It is noted that h denotes a height of the viewpoint. That is to say, $$Y = [h/\tan \theta + \tan \omega] \cdot (1/\cos^2 \theta) + c.$$

Hence, the following equation is given:

$Y = (-h \cdot DS/\cos^2 \theta) \cdot (1/y) + c$, wherein if $b = h \cdot DS/\cos^2 \theta, Y = (-b/y) + c$
(This equation indicates the equation (1))).

Figure 5:
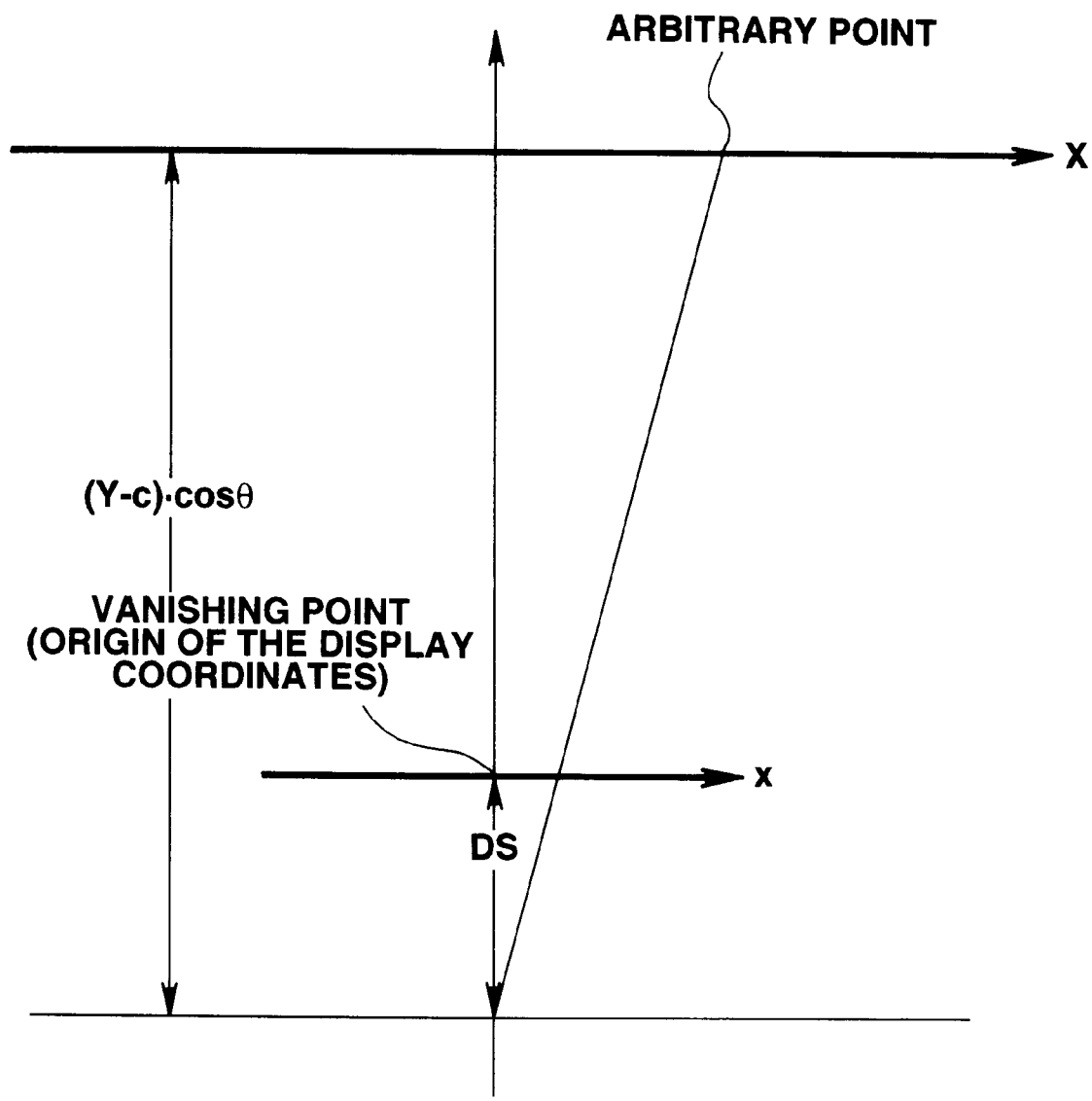
FIG. 5 is an explanatory view for explaining a coordinate transformation formula (Y direction) used to transform an arbitrary point on a road map coordinate into a display coordinate.

Next, as far as X direction is concerned, $X/[(Y-c) \cdot \cos \theta] = x/DS$ as appreciated from FIG. 5.

If the above equation (1) is used to modify the rearranged equation of $X = (\cos \theta/DS) \cdot x \cdot (Y-c)$, the following equation is given:

$$X = (\cos \theta/DS) \cdot x \cdot (-b/y), \text{ and, then,}$$

$$X = -b \cdot (\cos \theta/DS) \cdot (x/y).$$

It is noted that if $a = b \cdot (\cos \theta/DS)$, the X direction is as follows: $X = -a \cdot (x/y)$. The above equation gives the equation (2).

At a step S1 in FIG. 4, a specific numerical value is substituted into each of the equations (1) and (2) (the viewpoint and the value corresponding to the display range) so as to calculate the actual transformation equation of (X, Y).

Next, at a step S2 of FIG. 4, the road map information read out from the recording medium 7 is coordinate transformed by means of the transformation equation derived at the step S1.

At a step S4, the CPU in the navigating apparatus sets the view focusing point (view concentrated point) (xs, ys) on the image screen.

Next, at the step S5, the CPU calculates the compressibility (or expansion rate) in the lateral direction. At this step, the calculation indicated by the equation (6), permitting both scales in the lateral direction and in the longitudinal direction to become coincident with each other at the view focusing point (xs, ys). Next, at the step S6, the lateral compression (or expansion) on the road map information according to the above-described calculation result is carried out.

Next, at a step S7, the result of the transformation executed at the step S6 is displayed on the screen of the display unit 9.

As shown in FIG. 1A, the scale in the longitudinal direction is coincident with that in the lateral direction at the view focusing point (the traffic intersection 1 in this case) so that a distortion placed in the vicinity to the view focusing point becomes less. Consequently, a distortion-free display image approximated to the plan viewed road map representation and placed in the vicinity to the view focusing point can be achieved.

(SECOND EMBODIMENT)

In the road map representation of a navigating apparatus in which the road map in the form of the top view is displayed, the CPU often modifies the displayed road map dynamically when an expansion of the display is carried out when the vehicle approaches the traffic intersection at which the viewer is desired to recognize the detailed view. The enlarged view of the traffic intersection in the form of the top view is exemplified by a U.S. Pat. No. 5,121,326, (the disclosure of which is herein incorporated by reference). In this case, the lateral compression or expansion of the displayed road map is executed so as to always satisfy the equation (6) according to the parameter. At the view focusing point, the coincidence of the scales in the lateral direction and in the longitudinal direction can be made.

Figure 7:
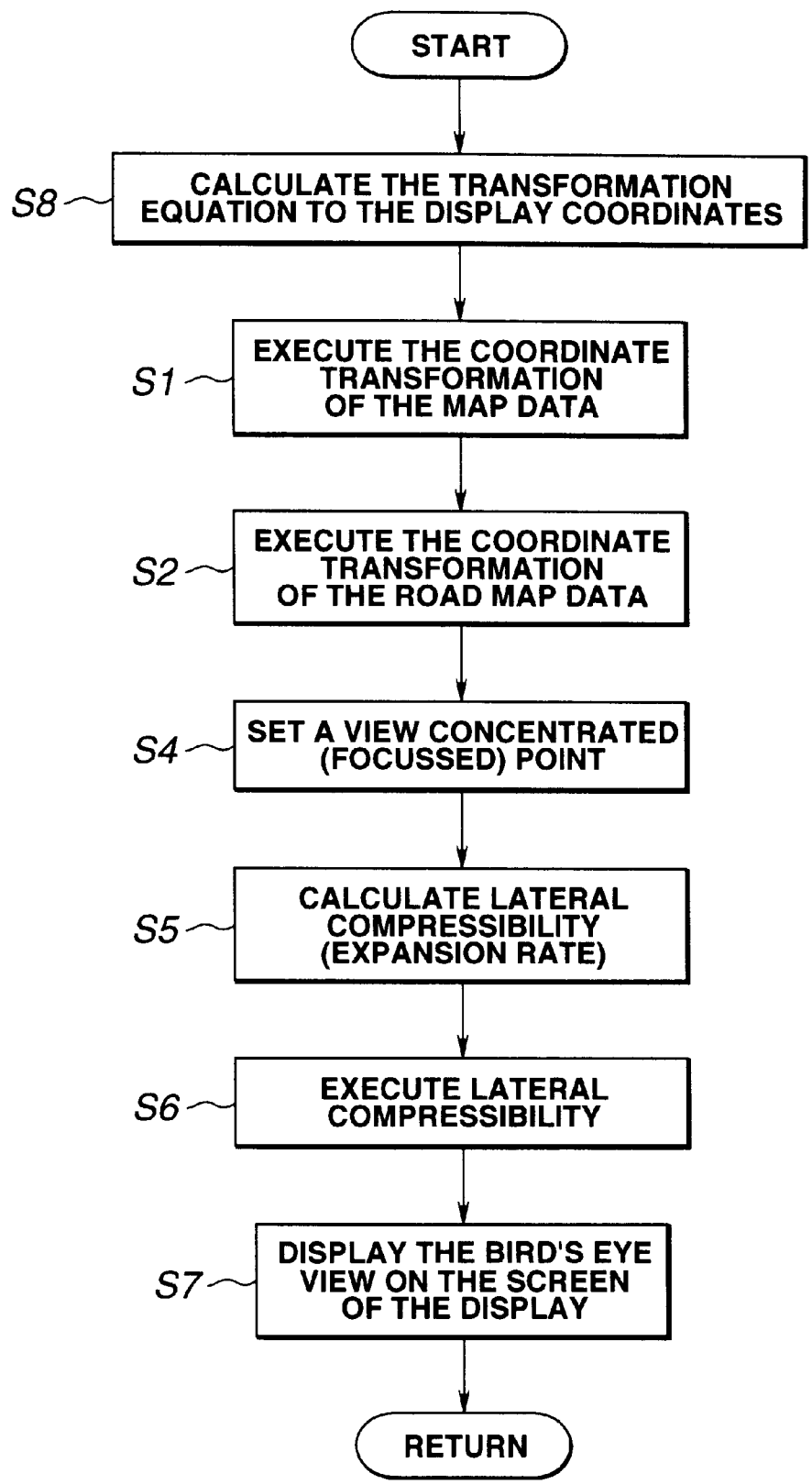
FIG. 7 is an operational flowchart executed by the computer in a second preferred embodiment of the vehicular navigating apparatus.

FIG. 7 shows the operational flowchart executed in the navigating apparatus in a second embodiment according to the present invention.

In FIG. 7, the step S8 is located at the first execution step of the flowchart shown in FIG. 4 in which the calculation of the parameter transformation on the display coordinates such as the viewpoint position of the bird's eye view, i.e., each parameter of a, b, and c in the equations (1) and (2) is made coincident with its corresponding target value. Otherwise, the same executions as FIG. 4 are processed.

(THIRD EMBODIMENT)

Figure 8:
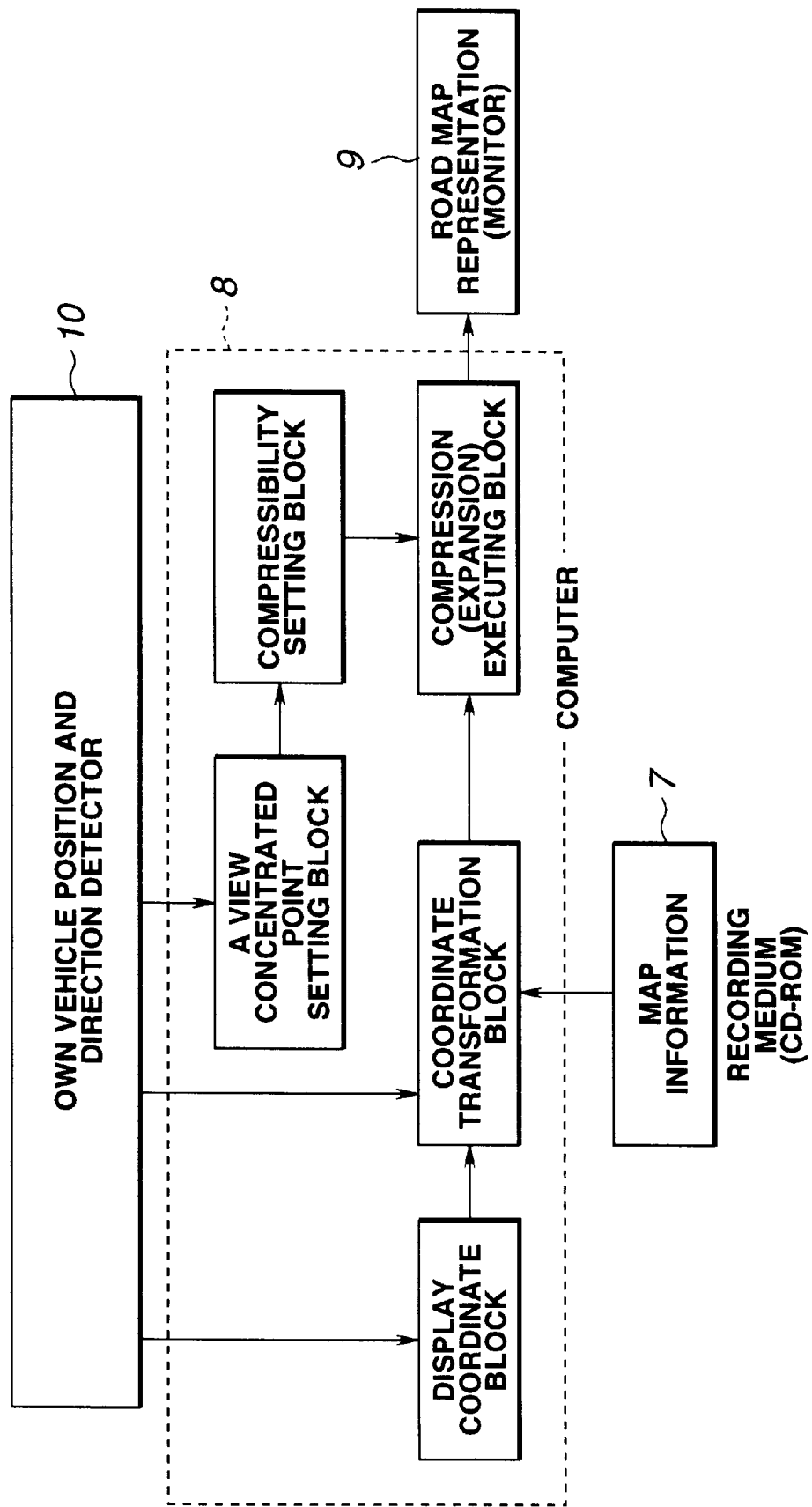
FIG. 8 is an operational flowchart executed by the computer in a third preferred embodiment of the vehicular navigating apparatus.

In the first and second embodiments described above, the positional information on the vehicle is not described. In a third embodiment, the current position of the vehicle in which the navigating apparatus is mounted is detected and is the view focusing point. FIG. 8 shows the circuit block diagram of the navigating apparatus carried out in the above arithmetic operation processing unit (CPU).

In FIG. 8, the reference numeral 10 denotes the vehicle current position determining block arranged so as to detect the current position of the vehicle and forwarding direction thereof including the GPS receiver for receiving signals derived from a plurality of communication satellites, a geomagnetism sensor for detecting the forwarding direction with respect to the North, a gyrocompass, and/or a vehicular road wheel speed rotation speed sensor.

Figure 9:
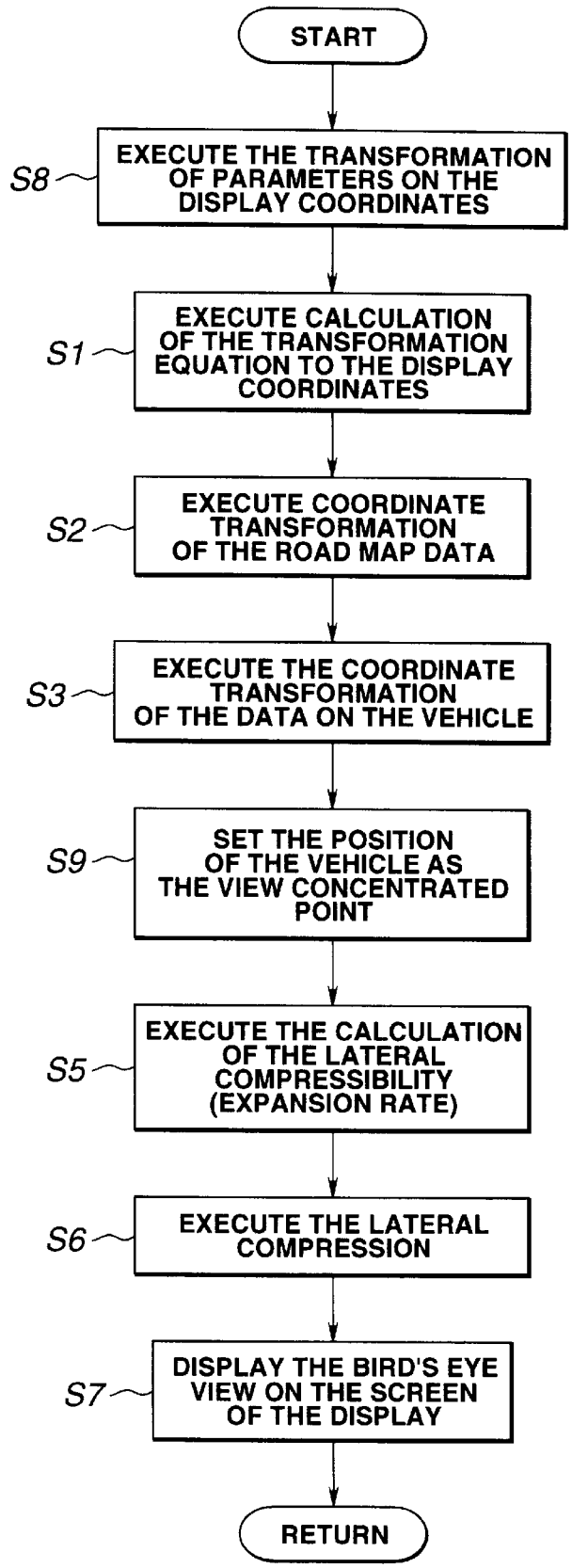
FIG. 9 is an operational flowchart executed by the computer in a third preferred embodiment of the vehicular navigating apparatus according to the present invention.

FIG. 9 shows an operational flowchart executed by the computer (the CPU) in the navigating apparatus in the third embodiment.

In FIG. 9, steps of S3 and S9 are provided next to the steps S3 and S9 adjacent to the step S2.

At the step S3, the CPU reads the vehicular data derived at the vehicle current position determining block 10 and executes the coordinate transformation on the position and direction of the vehicle.

At the step S9, the vehicular position described above is set as the view focusing point.

As described above, the position of the vehicle is set as the view focusing point so that the angle of the traffic intersection placed in the vicinity to the current position of the vehicle is made approximately coincident with the normal road map representation.

(FOURTH EMBODIMENT)

In a fourth embodiment, the view focusing point is set to a traffic intersection once before the current position of the vehicle.

Figure 10:
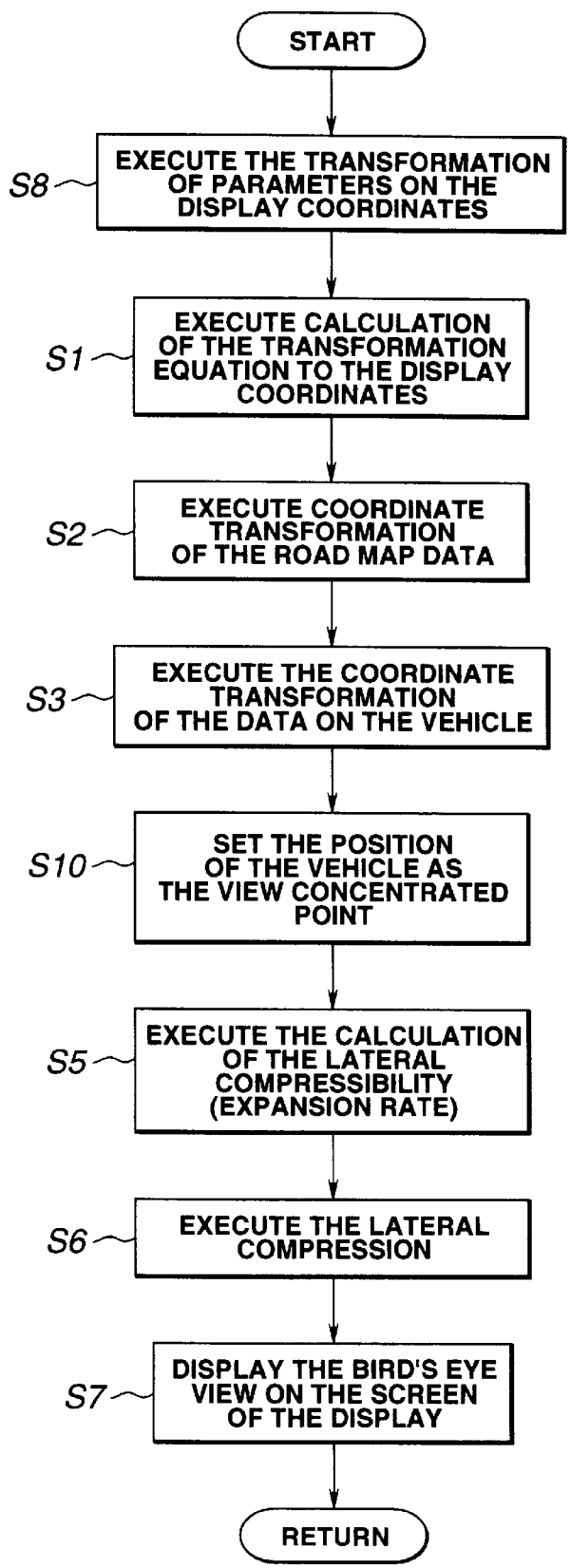
FIG. 10 is an explanatory view executed by the computer in a fourth preferred embodiment of the vehicular navigating apparatus according to the present invention.

FIG. 10 shows an operational flowchart executed in the navigating apparatus in the fourth embodiment.

A new step S10 is provided in place of the step S9 in FIG. 9.

As described above, the CPU sets the traffic intersection which is the first before the current position of the vehicle so that the display of the angle concerning the traffic intersection described above which is approximately coincident with the road map can be achieved.

(FIFTH EMBODIMENT)

In the bird's eye view representation described in the first to fourth embodiments, the scale in the longitudinal direction can be made coincident with the scale in the lateral direction only at the certain point (namely, the view focusing point). However, by modifying the bird's view representation in the longitudinal direction, the scales in both longitudinal and lateral directions can be made coincident with each other at a certain area (view focusing area).

Figure 11:
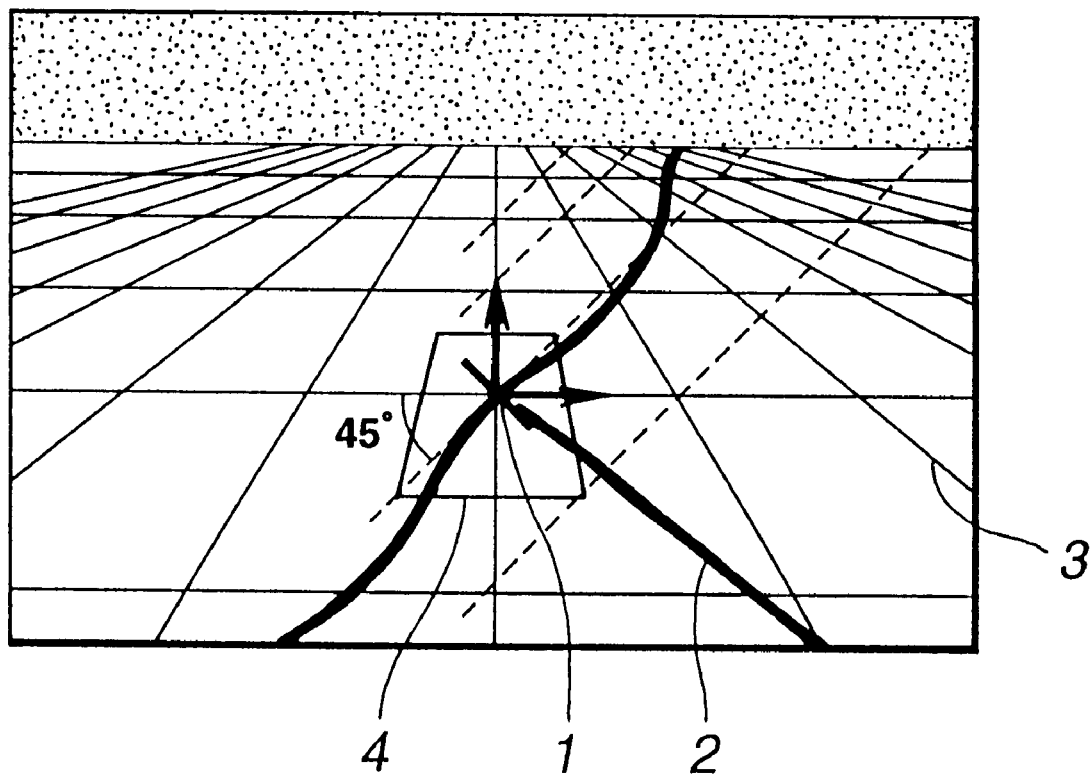
FIG. 11 is an explanatory view of a display image example executed in a fifth preferred embodiment of the vehicular navigating apparatus according to the present invention.

FIG. 11 shows a display example in a fifth embodiment in which those scales in the longitudinal and lateral directions are made coincidence with each other at the view focusing area 4.

Figure 12:
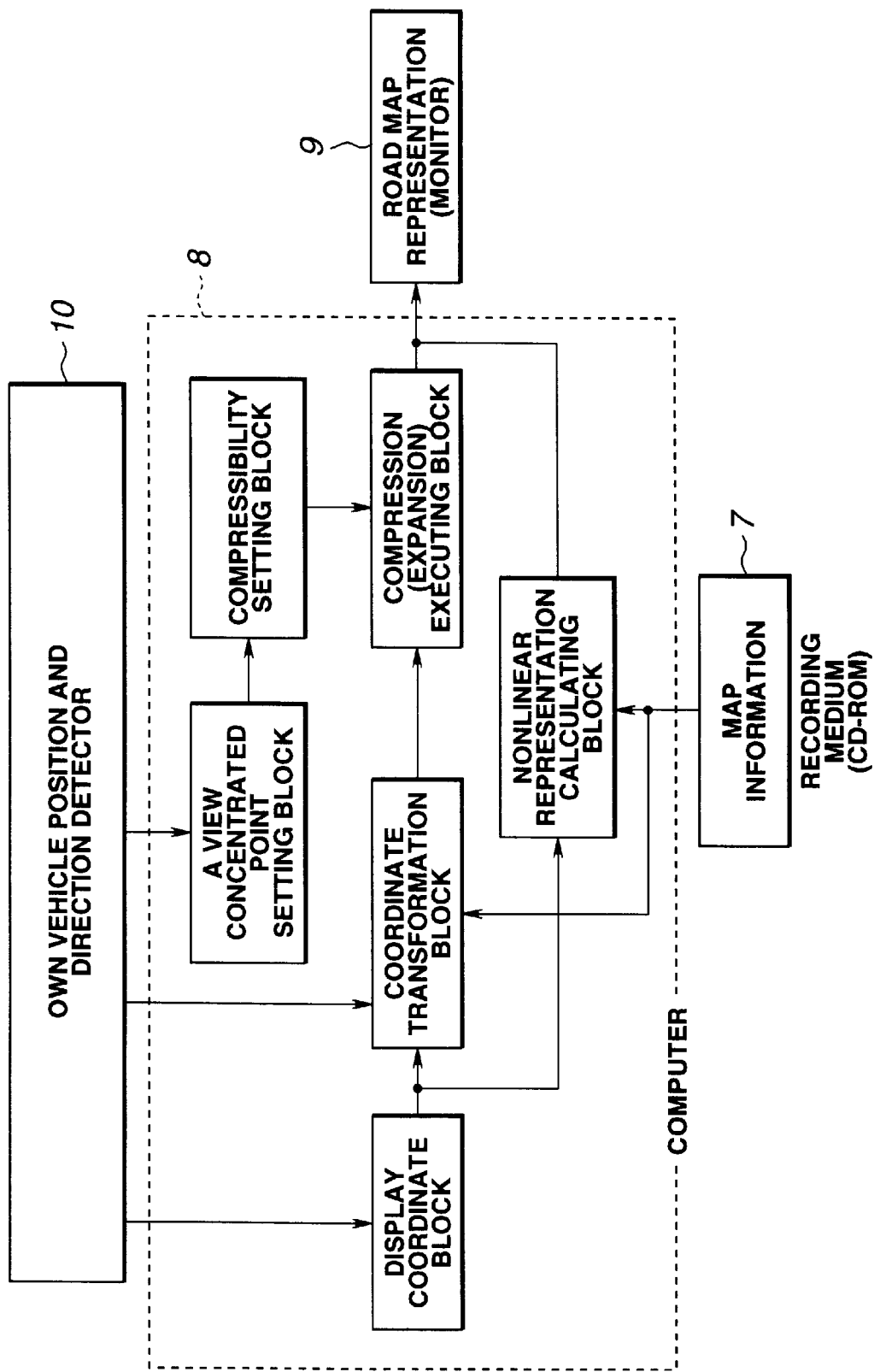
FIG. 12 is a functional block diagram of the vehicular navigating apparatus in the fifth preferred embodiment.

FIG. 12 shows a functional block diagram of the navigating apparatus in the above-described fifth embodiment.

Figure 13:
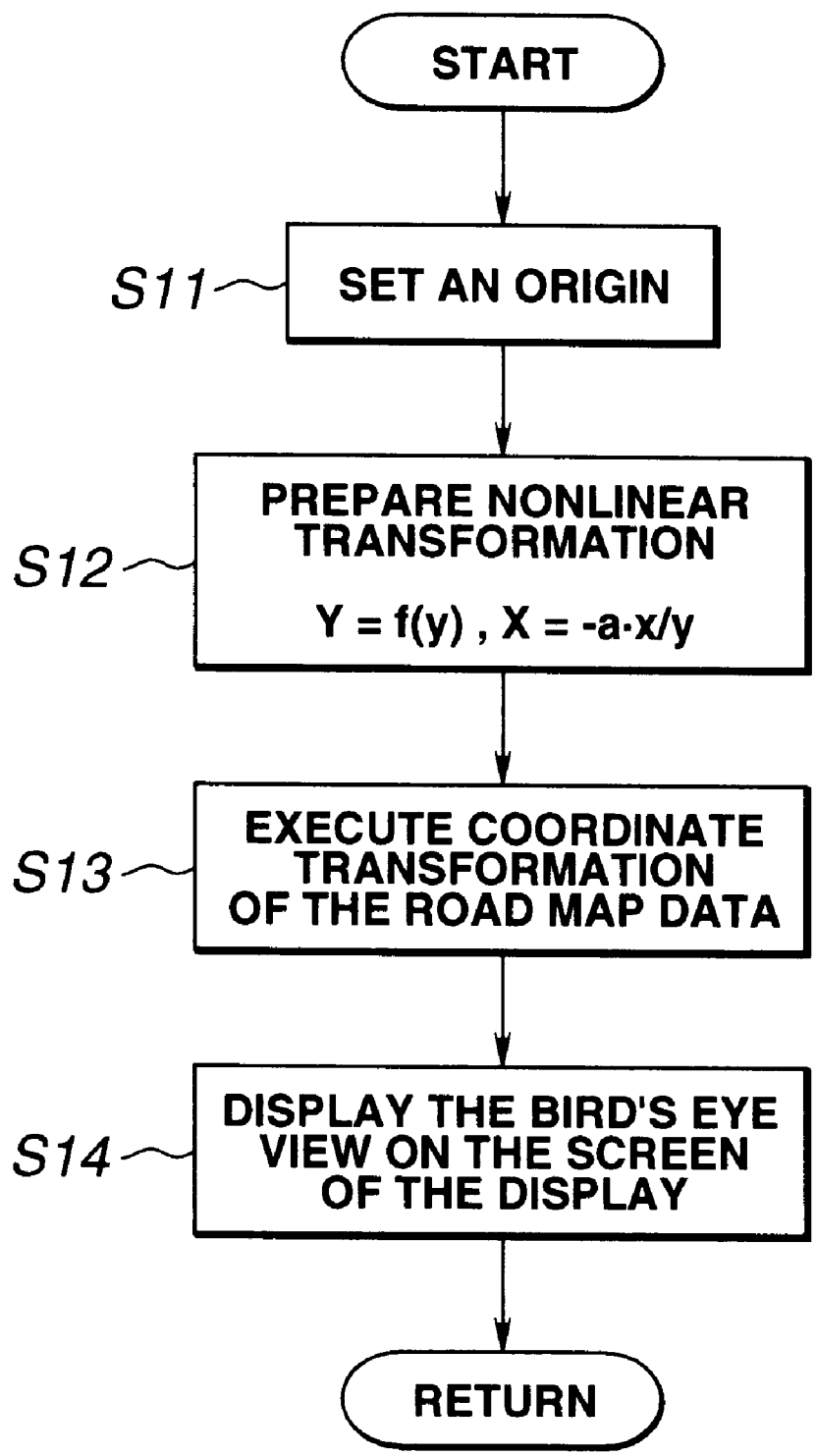
FIG. 13 is an operational flowchart executed by the computer in the fifth preferred embodiment according to the present invention.

FIG. 13 shows a flowchart executed by the above-described navigating apparatus in the fifth embodiment.

In the functional block diagram of FIG. 12 the arithmetic operation block 8, namely, the computer (CPU) includes a non-linear display calculation.

The flowchart of FIG. 13 indicates only the calculation of the coordinate transformations executed for the view focusing area 4. The calculations of the coordinate transformations executed for the other areas to be displayed are the same as those shown in FIG. 10.

A method of making coincidence with the scales in the longitudinal and lateral directions at a predetermined area (view focusing area 4) will be described below.

Suppose that the road map coordinates (X, Y) and the display coordinates (x, y) satisfy the equations (7) and (8) defined below.

$$Y = f(y) \tag{7},$$

$$X = -a \cdot (x/y) \tag{8}.$$

It is noted that if the Y coordinate satisfies the equation (7), y indicates constant when Y is constant so that the lateral grids become straight lines. It is noted that if the X coordinate satisfies the equation (8), x and y are proportional to each other when the value of X is constant.

At this time, $$dY/dy = f'(y) \tag{9}$$

$$dX/dx = -a/y \tag{10}$$

Namely, the equation (9) means that the value of dY/dy which is proportional to (1/scale) in the longitudinal direction indicates f'(y).

The equation (10) means that the value of dX/dx which is proportional to 1/(scale) in the lateral direction indicates −a/y.

Hence, to make the scale in the longitudinal direction coincident with that in the lateral direction, dY/dy=dX/dx may be established at the view focusing area, i.e., the following equations (11) and (12) needs to be satisfied:

$$f'(y)=-a/y \quad (11),$$

$$f(y)=a\cdot\log|y| \quad (12).$$

$$Y=-a\cdot\log|y| \text{ } (y=e^{-Y/a}, \text{ wherein e denotes a base of a natural logarithm}) \quad (13)$$

$$X=-a\cdot(x/y) \quad x=(-1/a)\cdot X\cdot y \quad (14)$$

In addition to the above function when another function to satisfy dX/dx, it is possible to generate the same road map representation.

The non-linear display calculation shown in the arithmetic operation block 8 in FIG. 12 includes the calculations according to the equations (13) and (14).

In addition, in FIG. 13, after the vanishing point is set to the origin at a step S11, the calculations using the equations (13) and (14) are executed. Using the result of calculations, the coordinate transformations on the road map data are executed at the step S13, its result being displayed at the step S14.

As described above, the bird's eye view representation is corrected (modified) in the longitudinal direction so that the scales in the longitudinal and lateral directions may be executed within the predetermined view focusing area.

The modification of the bird's eye representation in the lateral direction is executed in addition to that in the longitudinal direction so that the grid lines in the longitudinal and lateral directions remain straight lines. Consequently, no difference feeling of view occurs.

(SIXTH EMBODIMENT)

Figure 14:
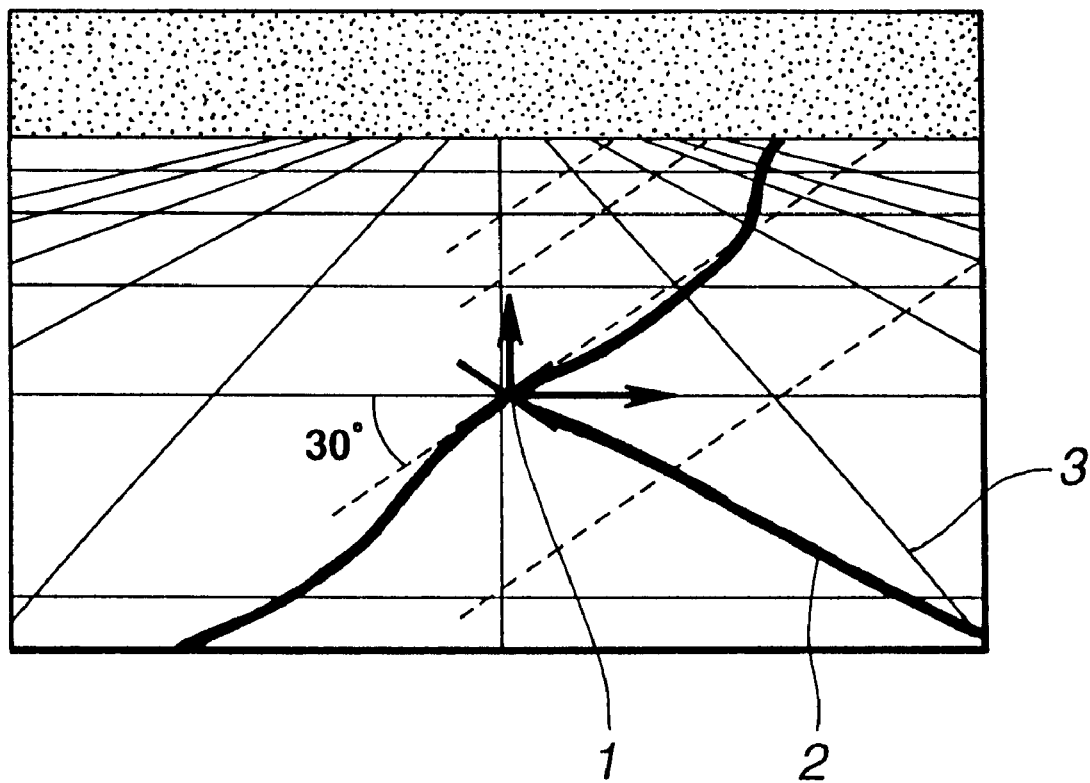
FIG. 14 is an explanatory view of a display image example executed by the computer in a sixth preferred embodiment according to the present invention.
Figure 15:
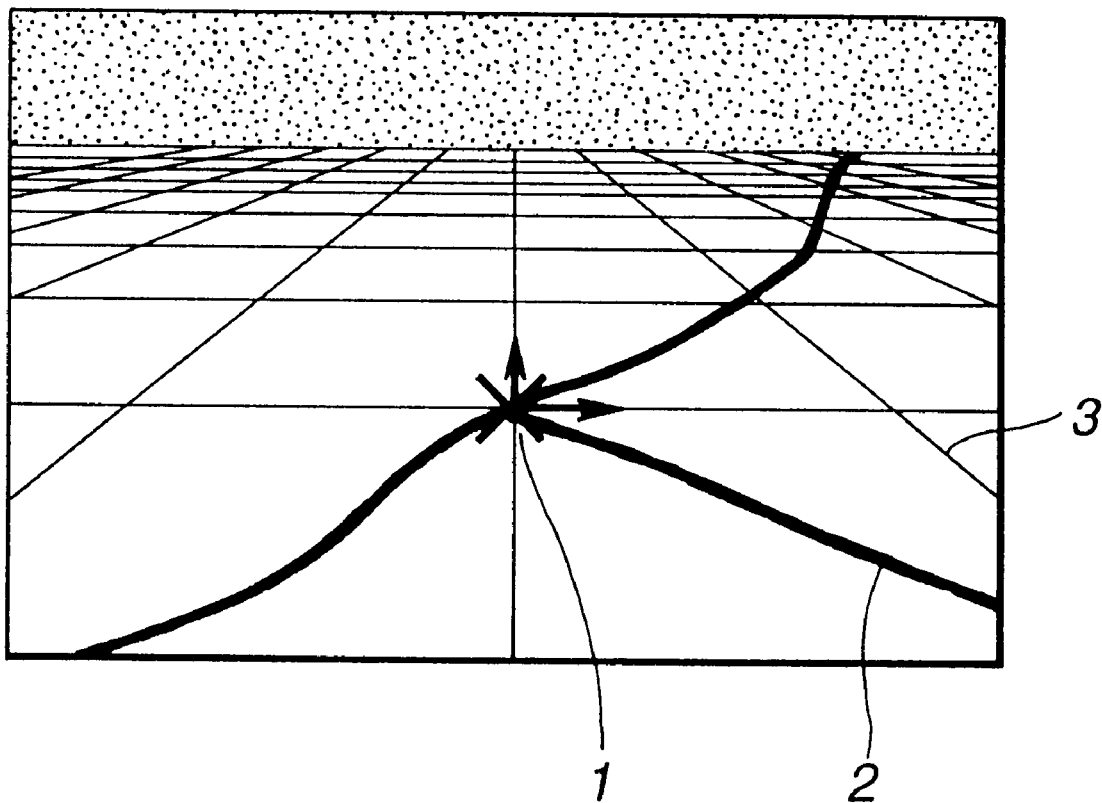
FIG. 15 is an explanatory view of a display image example executed by the computer in a seventh preferred embodiment according to the present invention.

Although, in the fifth embodiment of the navigating apparatus, the scale in the longitudinal direction is made coincident with the scale in the lateral direction, a ratio of the scale in the longitudinal direction to that in the lateral direction may be constant. Such a display example as in the sixth embodiment is shown in FIG. 14. In this display example of the sixth embodiment, the modification of the coordinate in the lateral direction is carried out in addition to that in the lateral direction so that the grid lines in the longitudinal and lateral directions remain the straight lines and no difference feeling of view occurs as in the case of the fifth embodiment.

Such a coordinate transformation as the ratio of the scales in the longitudinal and lateral directions being constant will be described.

Suppose in the same way as the fifth embodiment in order to make the ratio of the scales in the longitudinal and lateral directions within the view focusing point constant, the ratio is k. The following equations (15), (16), and (17) are shown:

$$dY/dy=k\cdot dX/dx \quad (15)$$

$$f'(y)=-a\cdot k/y \quad (16)$$

$$f(y)=-a\cdot k\cdot\log|y| \quad (17)$$

Hence, if the following equations (18) and (19) are used in the coordinate transformation of the view focusing area 4, the road map representation in which the ratio of the scales in the longitudinal and lateral directions at the view focusing area 4 becomes constant can be generated.

$$Y=-a\cdot k\cdot\log|y|, \quad y=e^{-Y/ak} \quad (18)$$

$$X=-a\cdot x/y, \quad x=(-1/a)\cdot X\cdot y \quad (19)$$

It is noted that the same road map may be generated when satisfying dY/dy=k·dX/dx in addition to the above functions.

A predetermined part of the road map display image includes the arbitrary point or arbitrary area described above.

Coordinate transformation parameters used for executing the coordinate transformation of the plan viewed road map coordinates to the display coordinates in the form of the bird's eye view include viewpoint position (height), line of sight from the viewpoint, an angle of field of view, distance DS and arbitrary constants (a, b, and c) described above.

What is claimed is:

1. An apparatus for navigating a mobile body through a road map display image, comprising:

an external memory arranged for storing a topographical road map information on a plurality of road map meshes;

a display reference point determining unit arranged for determining a display reference point on the basis of which a region in meshes of the road map stored in the external memory is determined to be displayed on an image screen;

an arithmetic operation processing unit arranged for executing arithmetic operation processing required to display any meshes of the road map information which corresponds to a display region determined to be displayed on the image screen in a form of a bird's eye view; and an image display unit arranged for displaying the region in meshes of the road map stored in the external memory unit to be determined to be displayed on the image screen thereof in the form of the bird's eye view, wherein said arithmetic operation processing unit comprises:

determining means arranged for determining the region in meshes of the road map stored in the external memory to be displayed on the image screen on the basis of the determined display reference point and for determining coordinate transformation parameters to be used for a perspective projection transformation of the region of the meshes of the road map into the bird's eye view on the basis of the determined display reference point;

road map data inputting means arranged for reading the road map information of the display region of meshes of the road map to be displayed from the external memory unit into said arithmetic operation processing unit;

coordinate transformation calculating means arranged for executing a coordinate transformation of the region of the road map meshes to be displayed into display coordinates on the perspectively projected plane using the coordinate transformation parameters; and display coordinate modifying means arranged for modifying the display coordinates at a predetermined part in the display region of the road map meshes so that a scale in a longitudinal direction with respect to the display image screen is coincident with that in a lateral direction at the predetermined part.

2. The apparatus for navigating a mobile body through a road map display image as claimed in claim 1, wherein said display coordinate modifying means comprises a first means arranged for executing either an uniform expansion or an uniform compression of said display coordinates in the lateral direction.

3. The apparatus for navigating a mobile body through a road map display image as claimed in claim 1, which further comprises a sensor, connected to said arithmetic operation processing unit, arranged for detecting a current position of the mobile body and wherein said predetermined part is a part of the display region of the meshes of the road map at which the current position of the mobile body is situated.

4. The apparatus for navigating a mobile body through a road map display image as claimed in claim 1, which further comprises a sensor, connected to said arithmetic operation processing unit, arranged for detecting a current position of the vehicle body and wherein said predetermined part is a part of the display region of the road map meshes at which a traffic intersection located before the current position of the mobile body is displayed.

5. The apparatus for navigating a mobile body through a road map display image as claimed in claim 1, wherein said predetermined part is a predetermined area within the display region of the road map meshes and wherein said display coordinate modifying means modifies the display coordinates in the longitudinal direction within the predetermined area of the display region of the road map meshes so that the scale in the longitudinal direction is coincident with that in the lateral direction within said predetermined area.

6. The apparatus for navigating a mobile body through a road map display image as claimed in claim 1, wherein said predetermined part is a predetermined area within the display region of the road map meshes and wherein said display coordinates in the lateral direction within the predetermined area of the display region of the road map meshes so that the scale in the longitudinal direction is coincident with that in the lateral direction within said predetermined area.

7. The apparatus for navigating a mobile body through a road map display image as claimed in claim 6, wherein said display coordinate modifying means modifies the display coordinates in the lateral direction and further comprises grid line painting means arranged for auxiliarily painting grid lines on the display region of the meshes of the road map information said grid lines indicating predetermined longitudes and latitudes and wherein said display coordinate modifying means modifies the display coordinates so that the scale in the longitudinal direction is coincident with that in the lateral direction at said predetermined part and the grid lines running at said predetermined part indicate straight lines.

8. The apparatus for navigating a mobile body through a road map display image as claimed in claim 1, wherein when the display coordinates on said predetermined part are $(x, y)$ and road map coordinates at said predetermined part are $(X, Y)$, $Y=(-b/y)+c$, $X=-a \cdot (x/y)$, wherein a, b, and c denote arbitrary constants, and when $b=-a \cdot y$, the scale in the longitudinal direction is coincident with the scale in the lateral direction at the predetermined part $(xs, ys)$.

9. The apparatus for navigating a mobile body through a road map display image as claimed in claim 5, wherein when the display coordinates are $(x, y)$, road map coordinates are $(X, Y)$, and both of the road map coordinates and of the display coordinates satisfy the following equations: $Y=f(y)$ and $X=-a \cdot (x/y)$ within said predetermined area and wherein since $dY/dy=df(y)/dy=f'(y)$ and $dX/dx=-a/y$, $f'(y)=-a/y$, $f(y)=-a \cdot \log |y|$ ($y=e^{-Y/a}$) so that $X=-a \cdot (x/y)$ and $x=(-1/a) \cdot X \cdot y$, wherein a denotes an arbitrary constant and e denotes a base of a natural logarithm.

10. The apparatus for navigating a mobile body through a road map display image as claimed in claim 9, wherein $dY/dy=k \cdot dX/dx$, $f'(y)=-a \cdot k/y$, $f(y)=-a \cdot k \cdot \log |y|$, wherein k denotes a ratio of the scale in the longitudinal direction to that in the lateral direction and wherein the following equations are used to execute the coordinate transformation of the road map coordinates into the display coordinates within the predetermined area: $Y=-a \cdot k \cdot \log |y|$, $y=e^{-Y/ak}$, $X=-a \cdot x/y$, and $x=(-1/a) \cdot X \cdot y$.

11. A method for navigating a mobile body through a road map display image, comprising the steps of:
   a) storing a road map information on a plurality of road map meshes;
   b) determining a display reference point on the basis of which a region in meshes of the road map stored at the step a) is determined to be displayed on an image screen of a display unit;
   c) executing an arithmetic operation processing required to display any meshes of the road map information which corresponds to a display region determined to be displayed on the image screen in a form of a bird's eye view; and
   d) displaying the region in meshes of the road map stored at the step a) to be determined to be displayed on the image screen thereof in the form of the bird's eye view, wherein said step c) comprises the steps of:
   e) determining the region in meshes of the road map information stored at the step a) to be displayed on the image screen on the basis of the determined display reference point;
   f) determining coordinate transformation parameters to be used for a perspective projection transformation of the region of the meshes of the road map information into the bird's eye view on the basis of the determined display reference point;
   g) reading the road map information of the display region of meshes of the road map to be displayed;
   h) executing a coordinate transformation of the region of the road map meshes to be displayed into display coordinates on the perspectively projected plane using the coordinate transformation parameters; and
   i) modifying the display coordinates at a predetermined part in the display region of the road map meshes so that a scale in a longitudinal direction with respect to the display image screen is coincident with that in a lateral direction at the predetermined part.

* * * * *